Figure 1:
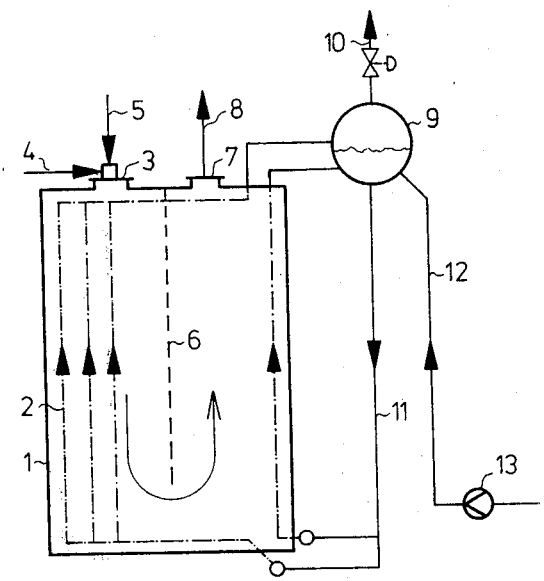

United States Patent [19]

Daniel et al.

[11] 4,379,131
[45] Apr. 5, 1983

[54] PRODUCTION OF PHOSPHORUS PENTOXIDE WITH UTILIZATION OF REACTION HEAT

[75] Inventors: Hellmuth Daniel, Erftstadt; Robert Queck, Hürth-Burbach; Bernhard Kuxdorf, Brühl; Herbert Püsche, Erftstadt, all of Fed. Rep. of Germany

[73] Assignee: Hoechst Aktiengesellschaft, Fed. Rep. of Germany

[21] Appl. No.: 297,159

[22] Filed: Aug. 28, 1981

[30] Foreign Application Priority Data

Sep. 3, 1980 [DE] Fed. Rep. of Germany ....... 3033109

[51] Int. Cl.³ .......................................... C01B 25/12
[52] U.S. Cl. .................................................. 423/304
[58] Field of Search .......................................... 423/304

[56] References Cited

U.S. PATENT DOCUMENTS 4,219,533  8/1980  Hartlapp et al. .................... 423/304

OTHER PUBLICATIONS

Welty, *Fundamentals of Momentum, Heat and Mass Transfer*, (1969), John Wiley & Sons, Inc., pp. 251–259.

*Primary Examiner*—O. R. Vertiz
*Assistant Examiner*—Wayne A. Langel
*Attorney, Agent, or Firm*—Connolly and Hutz

[57] ABSTRACT

The invention relates to process for making phosphorus pentoxide by subjecting elementary phosphorus to a combustion reaction with the aid of air, the reaction heat being utilized for the production of energy. To this end, the invention provides for the phosphorus to be subjected to combustion with dry air containing, per $m^3$, 5 g down to 0.01 g of water, inside a combustion chamber of which the metallic walls are arranged so as to form a cooling system with cavities therein and for a liquid and liquid/steam-mixture, respectively, to be circulated through the cooling system under pressure within the range 1 to 150 bars, the liquid or mixture assuming a temperature of more than 150° C. up to 500° C. Steam which is formed in the cooling system is continuously taken therefrom and replaced by an equivalent proportion of fresh liquid.

8 Claims, 2 Drawing Figures

PRODUCTION OF PHOSPHORUS PENTOXIDE WITH UTILIZATION OF REACTION HEAT

The present invention relates to a process for making phosphorus pentoxide, wherein elementary phosphorus is subjected to a combustion reaction with the aid of air, the reaction heat being utilized for the production of energy.

A process for making phosphorus pentoxide and polyphosphoric acid by subjecting yellow phosphorus to an oxidation reaction and absorbing $P_2O_5$ in polyphosphoric acid has been disclosed in DE-PS 1 300 527. In order to produce solid hexagonal $P_2O_5$ jointly with polyphosphoric acid, the process provides for molten elementary phosphorus to be subjected in the upper portion of a first reaction zone, of which the walls are cooled to temperatures lower than 150° C., preferably lower than 100° C., to a combustion reaction with a gas containing molecular oxygen; for a portion of resulting gaseous $P_2O_5$ to be condensed in the reaction zone; for solid $P_2O_5$ to be taken from the lower portion of the reaction zone and for off-gas with unseparated $P_2O_5$ therein coming from the reaction zone to be delivered to a second reaction zone for the production of polyphosphoric acid therein. To this end, it is customary for polyphosphoric acid containing less $P_2O_5$ than the polyphosphoric acid which is desired to be produced as the final product, to be cycled in the second reaction zone, and for the $P_2O_5$ present in the off-gas coming from the first reaction zone to be absorbed therein.

The combustion of yellow phosphorus with an excess of air is known to be a strongly exothermal process liberating, per kg of phosphorus burnt, 5 813 kcal or 24 233 kilojoule heat, which is required to be abstracted as rapidly as possible by intensively cooling the walls of the combustion chamber down to temperatures lower than 100° C., whereby the selection of structural materials suitable for the construction of the combustion chamber is naturally rendered very difficult. Needless to say, the high flame temperature, presence of oxygen, strong aggressiveness both of hot phosphorus pentoxide vapor and phosphoric acid haze, which is being formed upon contact of the phosphorus pentoxide with steam contained in air or oxygen, are factors of strong corrosiveness for the inside wall of the combustion chamber, the corrosiveness being a problem which becomes the more serious the higher the temperature selected for the cooling elements provided in the combustion chamber. Heretofore, it has not been possible commercially to utilize reaction heat which is evolved on subjecting yellow phosphorus to combustion with an excess of air, and it has indeed been necessary for it to be abstracted by means of important quantities of cooling water, and left unused.

The problem of recovering and utilizing the reaction heat evolved upon the combustion of yellow phosphorus with air has already been generally discussed in the literature by A. D. Mikhailin et al. in "The Soviet Union Chemical Industry 5", No. 7, July 1973, with reference to its corrosiveness for those structural materials which are exposed to the combustion process.

Even high grade nickel-based special refined steels have been noted to be not fully satisfactory for permanent use.

The present invention now provides a process for making phosphorus pentoxide by subjecting yellow phosphorus to combustion with air under conditions which permit the reaction heat to be recovered and problems of corrosiveness encountered heretofore to be obviated.

The present invention relates more particularly to a process for making phosphorus pentoxide by subjecting elementary phosphorus to a combustion reaction with the aid of air, the reaction heat being utilized for the production of energy, which comprises: subjecting the phosphorus to combustion with dry air containing, per $m^3$, 5 g down to 0.01 g of water, inside a combustion chamber of which the metallic walls are arranged so as to form a cooling system with cavities therein; circulating a liquid and liquid/steam-mixture, respectively, through the cooling system under pressure within the range 1 to 150 bars, the liquid or mixture assuming a temperature of more than 150° C. up to 500° C.; steam which is being formed in the cooling system being continuously taken therefrom and replaced by an equivalent proportion of fresh liquid; and hot $P_2O_5$ issuing in vapor form from the combustion chamber being condensed and worked up into desirable final product.

A preferred feature of the present process provides for the phosphorus to be subjected to combustion with the use of predried air containing, per $m^3$, from 0.3 to 0.1 g of water.

A further preferred feature provides for water to be used as the heat carrier or liquid circulated. As a result of its being circulated, the liquid or liquid/steam-mixture absorbs heat and generally assumes temperatures of from 200° to 400° C. under pressures of from 15 to 90 bars.

In order to avoid corrosion, it is also preferable for the walls and cooling system, respectively, of the combustion chamber to be made of stainless steel complying with DIN specification 17 440 (DIN stands for German Industrial Standard). It is more particularly possible for the walls of the combustion chamber to be formed, for example, of a plurality of metallic tubular structures which are directly welded together, of finned tubes or membrane tubes.

The phosphorus pentoxide in vapor form which is obtained on subjecting phosphorus to combustion is normally taken from the combustion chamber at a temperature of from 300° to 1000° C., and it is possible for it to be either condensed or worked up into phosphoric acid.

Figure 2:
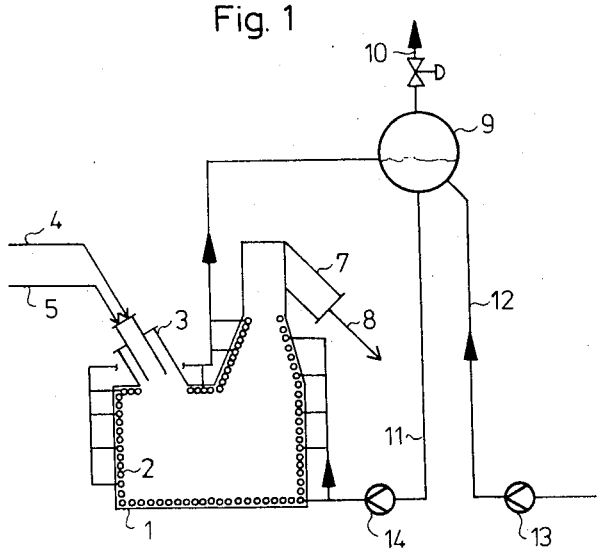

Two exemplary forms of apparatus which have successfully been used in carrying out the process of this invention are shown diagrammatically in the accompanying drawing, FIGS. 1 and 2.

FIG. 1 substantially shows the chamber for combustion of yellow phosphorus therein, the chamber being bounded by a protective insulated jacket (1) surrounding the tube wall (2) which is formed of a plurality of vertically arranged metal tubes. The combustion chamber is furthermore provided with means (3) permitting yellow phosphorus to be sprayed or atomized with the aid of air which comes from a conduit (4), the phosphorus which is admitted through a conduit (5), being liquefied upstream of the spraying or atomizing means. Disposed inside the combustion chamber is a partition formed of tubular structures (6) deflecting incoming combustion gas and/or phosphorus pentoxide in vapor form which are removed through an outlet (7) and conduit (8). For absorption of combustion heat, the individual tubes forming tube wall (2) are filled e.g. with water which is partially evaporated. Steam and water are separated from one another in a separator (9), the steam being removed through conduit (10).

Unevaporated water is recycled through conduit (11) to tube wall (2), and water lost by evaporation is replaced by fresh water which is admitted through line (12) provided with feed pump (13).

The apparatus shown in FIG. 2 is the same as that shown in FIG. 1 save that the individual tubes forming tube wall (2) are arranged horizontally, through which water is circulated by means of an additional circulation pump (14).

Needless to say, the present process is a very desirable step forward in the art inasmuch as none of the methods described heretofore provides for the reaction heat set free therein to be utilized. Inasmuch as the structural materials have long been held to lack satisfactory resistivity at the cooling temperatures of more than 100° C. necessary in the combustion chamber for the generation of steam, the artisan has long been prevented from trying to solve the problem. The process conditions selected in accordance with this invention have now unexpectedly been found to avoid undesirable deposition of material on the tubes forming the tube wall and to ensure good transmission of reaction heat to the liquid carrier, e.g. water. In addition to this, the construction material used for making the combustion chamber is less seriously corroded than would have been expected, due to the use of predried air. In other words, the invention provides a practicable route to the production of phosphorus pentoxide with commercial utilization of energy left unused heretofore.

The following Examples illustrate the invention:

EXAMPLE 1

100 l or 170 kg of elementary, liquid, yellow phosphorus with a temperature of 75° C. was introduced into a combustion chamber provided with stainless steel tube walls (2) and subjected to combustion therein in the presence of dry air under a pressure of 6 bars. 60% of the 4 gj/h reaction heat set free during the combustion was transmitted through the tube walls to the heat carrier liquid which was fully desalted and degassed water. It was partially evaporated.

The water/steam-mixture travelled upwardly through the individual tubes (2) into a collecting tube in which steam and liquid were separated from one another. By means of a pressure-regulating valve disposed in conduit (10), the steam in the evaporator was maintained under a pressure of 20 bars and resulting saturated steam was removed through conduit (10), at a rate of 1.1 tons per hour. The liquid phase in evaporator (9) was delivered through cycle line (11) and a lower distributing tube to the ascending tubes forming tube wall (2). The circulation cycle of liquid caused by density difference in the circulation system was thus closed.

The separator (9) had a level control instrument associated with it which permitted sufficient water to be always admitted to the cooling system, fresh water being admitted through conduit (13). The burner (3) was disposed so as to open downwardly into the combustion chamber of which the wall portion in the vicinity of the burner was exposed to radiant heat. Wall temperatures between 300° and 400° C. were determined for that portion of the combustion chamber. In the base portion of the combustion chamber, the combustion gases were deflected at an angle of 180° C. so that it was possible for vaporous phosphorus pentoxide to leave the combustion chamber through outlet (7).

EXAMPLE 2

The procedure was as in Example 1, but the tubes inside the combustion chamber were partially arranged in horizontal or slightly ascending position. In addition to this, the heat carrier, which was water, was continuously circulated through the tubes with the aid of a pump.

We claim:

1. In the process for making phosphorus pentoxide by subjecting elementary phosphorus to a combustion reaction with the aid of dried air inside a combustion chamber of which the metallic walls are arranged so as to form a cooling system with cavities therein; circulating a cooling medium through the cooling system for taking up the reaction heat, the improvement which comprises subjecting the phosphorus to combustion with dried air containing, per m$^3$, 5 g down to 0.01 g of water; circulating a liquid or liquid/steam-mixture through the cooling system under pressures within the range of 1 to 150 bars, the liquid or mixture assuming a temperature of more than 150° C. up to 500° C.; steam which is being formed in the cooling system being continuously taken therefrom and utilized for the production of energy; an equivalent proportion of fresh liquid being introduced into the cooling system; and hot P$_2$O$_5$ issuing in vapor form from the combustion chamber being condensed or worked up into desirable final product.

2. The process as claimed in claim 1, wherein water is the liquid circulated.

3. The process as claimed in claim 1, wherein the liquid or liquid/steam-mixture circulated is heated to 200° to 400° C. under pressures of 15 to 90 bars.

4. The process as claimed in claim 1, wherein the dried air contains, per m$^3$, 0.3 to 0.1 g of water.

5. The process as claimed in claim 1, wherein the walls and the cooling system, respectively, of the combustion chamber are made of stainless steel.

6. The process as claimed in claim 1, wherein the walls of the combustion chamber and the cooling system, respectively, are comprised of metallic tubular structures directly welded together, of finned tubes or membrane tubes.

7. The process as claimed in claim 1, wherein vaporous phosphorus pentoxide with a temperature of 300° to 1000° C. is taken from the combustion chamber.

8. The process as claimed in claim 1, wherein the vaporous phosphorus pentoxide taken from the combustion chamber is worked up into phosphoric acid.

* * * * *